US007330828B2

(12) United States Patent
Schoder et al.

(10) Patent No.: US 7,330,828 B2
(45) Date of Patent: Feb. 12, 2008

(54) SYSTEM AND PROCESS FOR THE PRODUCTION OF A CUSTOMER INDIVIDUALIZED PRINT PRODUCT

(76) Inventors: Detlef Schoder, Auf der Schützenhoöhe 6, Bendorf (DE) 56170; Stefan Sick, Schafbergstrasse 8, Baden-Baden (DE) 76534

( * ) Notice: Subject to any disclaimer, the term of this patent is extended or adjusted under 35 U.S.C. 154(b) by 521 days.

(21) Appl. No.: 10/868,389

(22) Filed: Jun. 14, 2004

(65) Prior Publication Data
US 2005/0021404 A1    Jan. 27, 2005

Related U.S. Application Data

(63) Continuation of application No. PCT/EP02/14348, filed on Dec. 16, 2002.

(30) Foreign Application Priority Data
Dec. 15, 2001 (DE) ................................ 101 61 684

(51) Int. Cl.
G06Q 30/00   (2006.01)
G06F 17/30   (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| 5,114,291 | A   | 5/1992 | Hefty |
| 5,213,461 | A   | 5/1993 | Kalisher |
| 5,765,874 | A   | 6/1998 | Chanenson et al. |
| 5,948,061 | A   | 9/1999 | Merriman et al. |
| 6,085,165 | A   | 7/2000 | Ulwick |
| 6,279,013 | B1* | 8/2001 | LaMarca et al. ............ 715/500 |
| 6,990,633 | B1* | 1/2006 | Miyasaka et al. ........... 715/517 |
| 2001/0049636 | A1* | 12/2001 | Hudda et al. ................. 705/26 |
| 2002/0040374 | A1* | 4/2002 | Kent ........................... 707/516 |
| 2002/0087594 | A1* | 7/2002 | Peters ......................... 707/511 |
| 2002/0152458 | A1* | 10/2002 | Eyer et al. ..................... 725/1 |

FOREIGN PATENT DOCUMENTS

GB    2357877    7/2001

(Continued)

OTHER PUBLICATIONS

Neher, Jacques, "Personalized Magazines Near," Advertising Age, Chicago, Nov. 12, 1979, vol. 50, is . . . 48, p. 47.*

Primary Examiner—Yogesh C. Garg
Assistant Examiner—Amee A. Shah
(74) Attorney, Agent, or Firm—Martin Fleit; Fleit Kain Gibbons Gutman Bongini & Blanco P.L.

(57) ABSTRACT

A system and method for production of a printed product individualized for the customer, which offers the customer a selection of information content, depending on the variable payment (price) and the profile of interests thereof. Based on the price decision of the customer, a customer-specific relationship of optionally edited information content to customer-specific advertisement is generated. A dynamic matching of the profile of interests is carried out by feedback. The form of the printed product is determined by the selection of the information and the advertisements and the combination thereof according to the customer-specific relationship and profile of interests by means of an inventive layout. The printed product produced is suitable for traditional processing by print media, customer-specific in price, quality and quantity, achieves the interests of the advertisers with targeted advertising and the interests of the producers of the printed product with regard to achievable margins by providing a highly-attractive customer-specific product.

15 Claims, 8 Drawing Sheets

FOREIGN PATENT DOCUMENTS

| | | | |
|---|---|---|---|
| JP | 2001306654 A | * | 11/2001 |
| WO | WO 00/60513 | | 10/2000 |
| WO | WO 00/75798 A1 | | 12/2000 |
| WO | WO 00/76204 | | 12/2000 |
| WO | WO 00/79798 A1 | | 12/2000 |

* cited by examiner

SYSTEM AND PROCESS FOR THE PRODUCTION OF A CUSTOMER INDIVIDUALIZED PRINT PRODUCT

CROSS REFERENCE TO RELATED APPLICATIONS

This application is a continuation of International Patent Application PCT/EP02/14348 filed Dec. 16, 2002, the contents of which are here incorporated by reference in their entirety; the benefits of 35 USC 120 are here claimed.

BACKGROUND OF THE INVENTION

1. Field of the Invention

The invention relates to a system and process for the production of a print product individualized for a customer, based on a customer individual profile of interest.

2. Prior Art

In the 1990s, numerous electronic newspapers and journals (e.g. HeadsUp, iNews) as well as so-called online clipping services (selection of press releases) emerged, allowing the customer to select among a large number of categories of topics and to compose his own individual journal or newspaper. Hereby, the individualized online edition can be transmitted either via fax/telecopy to a fax receiver or via the Internet to the electronic mail box of the customer. Also popular is the query/display of dynamically individualized web pages.

These electronic forms of newspapers and journals have different advantages. Firstly, the electronic forms offer immediacy, which is solely limited by the constraint of editorial effort to update and revise news. Secondly, the electronic forms offer easy-to-use access to further information sources e.g. by so-called hyperlinks. Moreover, the customer easily can vary the scope of coverage of the information research, while being online and dialoging with the system. Finally, these online-journals and newspapers can make use of a wide range of data types; e.g. moving images or animation.

However, major disadvantages of such electronic media exist. The customer has to possess modern hardware and software: e.g. a Personal Computer, a modem, and interface software. The hardware and software require operating know-how from the customer. Furthermore, he has to take the time for the online access and the online selection. Moreover, generating hard copies on desktop printers is sometimes complicated, expensive, and time consuming.

Hitherto, the composition of an online newspaper or journal is limited by online sessions of the customer and the specific printing format of the available desktop printer. The printed product in this case is neither in format nor in quality comparable to the traditional appearance of a mass-printed product, i.e. a newspaper.

From WO 00/ 76204 A1, a document delivery system is taught that includes printing a document automatically. The document is transmitted to the printing device via the Internet according to a given print work flow. Advertisements can be inserted into the document according to the user profile. A disadvantage of the system is that a feedback mechanism allowing the customer to modify the interest profile is not designed and not provided. Moreover, the layout of the document is not generated automatically.

Furthermore, from GB 2 357 877 A, a process for the automatic formatting of a computer-generated document is known. Hereby, it is disadvantageous, that the selection of documents is not generated at optimal utilization of the available space of the printing page (especially to fill blank spaces) and that the layout designs from documents different in content, form, and design (e.g. pictures, articles, and combinations of any kind of pictures and articles) does not take place.

The patent U.S. Pat. No. 5,948,061 (Merriman et al.) describes targeted advertisement via communication networks such as the Internet. The selection of the advertisement is based on the access of a customer to a web page, which is connected with an advertisement process and not (as shown in the present process) by the selection of a topic category.

The described system in Merriman et al. (U.S. Pat. No. 5,948,061) does not meet the typical requirements of an advertisement for a mass-produced printing product. According to Merriman et al., the printing template determines the mix of information and advertisement content. Moreover, there are technical restrictions concerning the design of the layout. Furthermore, the advertisement as well as the feedbacks of the customer take place in the system described in Merriman et al. (U.S. Pat. No. 5,948,061) within a TCP/IP (Transmission Control Protocol/Internet Protocol) based network.

Compared to the online newspapers and online journals there are arguments in favor of the traditional mass-printed product. Firstly, a mass-printed product like a classic newspaper or journal is congenial to traditional reading habits. Parts of the newspaper may be marked or cut out, the optical resolution and print quality are standardized and the format and folding is typical for a newspaper or journal. Secondly, there is no need for any computer software or hardware and the print product can be taken to any place without any need for a printing device. Moreover, there is no specific operating knowledge required.

It is well known that the revenue model of the classic newspaper or journal is based on the sales price and mostly to a major share on advertisement. Concerning the relation of advertisement to editorial information (brief: "information") at which various newspapers and journals are offered, the ratio of advertisement is between 0% (e.g. for some scientific journals) and 100% (e.g. free of charge, distributed advertisement journals). Customers choose by subscription, at the newsstand, or by reception of a free-of charge delivered newspaper for a non-individualized, pre-configurated product with advertisements relating to the information, without having the possibility at this classic products to take direct influence on content, design and price.

Advertisements in newspapers and journals are distributed in the same way to all readers. There is no selection of target customers or prospects, which leads to the typically low response rate of the advertisement. Merely the knowledge on the positioning of a newspaper respectively a journal in the media market and on the preferences of the average reader of the respective newspaper or journal limits the risk of untargeted advertisement. Approaches in the direction of individualization are limited to regionally adapted editions (Sectioning) and reader group specific inserts. Thereby the detection of the potentially quickly changing customer perceptions and preferences is difficult and cost-intensive.

The customization of print products is shown, for example, in U.S. Pat. Nos. 5,114,291 (Hefty) and 5,213,461 (Klisher). These patents describe different, computer based layout methods, which serve to produce a single customer individual print product (e.g. a children's book). Non-variable text modules and variable text modules, which can be varied individually, are used.

Chanenson et al. (U.S. Pat. No. 5,765,874) extend customer individualization to a mass production process by use of pre-printed paper documents with blank space for individual text elements.

None of these patents includes an automatic selection from a large group of different and diverse text documents and a free combination of these documents to a final layout. This is required when customers want to choose from various documents, these documents being arranged according to their preferences and combined in a single document.

An Internet based design system for the customer individual mass production (mass customization) of goods is described in patent WO 00/60513 (Moritz). The shown system is preferably applied in the production of hats. The customers become designers of their own products and select via Internet among various design features. The system displays the designed object and generates a specific processing instruction for the production process.

Another technology for customer individual mass production is specified in U.S. Pat. No. 6,085,165 (Ulwick), which refers to the mass customization of electronic devices, e.g. portable radios or cardiac pacemakers. The customer (or specially authorized persons, e.g. physicians) decides personally on the preferred adaptation of the electronic device.

None of these examples relates to print media or to the special requirements for the customer individual mass production of print products.

In the above-mentioned patents, the decision of the customer are one-time decisions, or e.g. in the case of the cardiac pacemaker related to the after production or after sales variability of the technical product. The mentioned systems are not able to learn from customer behavior related to a sequence of purchase decisions. In the case of a print product, it is obvious that there is after-production/after-sales no content variability of the purchased product itself. Only in the time between the editions, readers have the possibility to contact the producer of the print product and take influence on the design of the product.

The possible variability of contents is big and the wide range of potential content elements (e.g. different topics, different sources) within a rubric like "sports" can be subject to permanent change e.g. a daily adaptation. Moreover, the above-mentioned patents don't offer options to make a selection concerning the prices respectively the offered information content in dependency of a variable amount for payment.

The patent U.S. Pat. No. 6,279,013 describes an interactive newspaper. The reader has the possibility e.g. to notify the main focus of interest by ticking certain fields on the newspaper. Afterwards the newspaper is scanned to read the ticked fields. The hereby-transmitted information serves to modify the interest profile of the reader. In the case of the aforementioned interactive newspaper, it is disadvantageous that the user cannot decide on the mixing ratio of advertisement to information. The single newspaper articles are printed in a given layout-pattern without possibilities for variance.

It is known to the expert in the field that costs for a traditional offset printed newspaper are mainly occurring in the edition, the layout and production of a printing plate, the set-up of the printing process, the raw material (paper, ink) and the logistics. The traditional offset printing process itself can be regarded due to the high automation and the "economies of scales" in case of higher number editions as minor cost driver.

Traditional offset print for small editions or to the extreme for an edition of lot size 1 cannot be realized in an economically reasonable way.

Indeed, the digital print technology emerging in recent years has, among other things, cut costs significantly for layout, set up, and the print itself and allows more and more editions with lot size 1. It is the overriding goal of the present invention to provide a partially or completely mass customized print product, which is in its principal embodiment congenial to traditional reading habits and also takes into account the customer's choice concerning price and content.

SUMMARY OF THE INVENTION

Therefore, it is a first objective of the invention to provide a mass customized print product in which the share of advertisement to given information is correlated to the price the customer intends to pay for the information he gets. A second objective is to give customers by a feedback mechanism the possibility to influence directly the content of his individual print product. A third objective is to correlate advertisement to the topics the customer selects and to his known preferences determined from historical data on the customer's selections. Moreover, it is the objective to gather information on customer preferences for specific topics and to provide information to the publishing company on topics, which are of interest for readers.

The present invention provides a dynamic system, which executes an automated process, initiated by the customer's selection of price, configuration, and content of a print product. The system selects from a pool of information units, to which different subject categories and sub-categories can be allocated, and which can comprise e.g. summaries of press articles, press clippings, full articles, pictures, and drawings. The selection is done according to the customer's choice of categories and sub-categories and combines those with advertisement units belonging to the same or correlated categories. These advertisement units are selected by the system from a second pool (pool of advertisement units).

Furthermore, the invention comprises a feedback mechanism, allowing the customer to change his subject choice and/or order complementary information for the next edition. The automated system shows according to the present invention a learning behavior based on the feedback of the customer and can adapt completely or partially the initial selection of the customer to his most recent preference.

According to the present invention, the automated system determines the total volume of the content of the individual edition as well as the ratio information units to advertisement units according to a customer chosen price category and to a price calculation model, comprising the cost structure of the edition.

In the present invention, the edition is generated by means of an automated layout adjustment. The resulting layout from the total process is forwarded in digital format to a printing machine or printer that executes the print of the individual editions.

In the following, we refer to the process as a, "Customer individual automated compilation process of mass produced print products," because the customer—according to the invention-decides himself on the price category as well as the thematic, qualitative, and quantitative content of his individual edition and the compiling of content and advertisement is executed by an automated process.

The present invention meets the specific information demand of the customer and allows individual pricing.

Moreover, it allows to the advertising company targeted advertisement and takes into account the economic interests of the publishing company, respectively the producer, who has to achieve by sufficient advertisement the target gross margin. Furthermore, the system provides to the publishing company and/or the producer the most recent information on the information demand of every single customer as well as the totality of all customers.

The present invention is especially suitable for a customer-individualized newspaper or journal (e.g. with daily or weekly edition). Reasons are the variety, polymorphism and width of the information offers with rapidly changing contents. This requires a high frequency of customer decision processes (e.g. daily, weekly) as well as consequential rapid learning behavior of the system concerning the customer preference. Moreover, advertisement is of decisive importance for the achievement of the gross margin, which is also taken into account by the system according to the present invention.

The invention allows to generate by means of a fully automated process a print file in order to produce a mass produced customer-individualized ("mass customized") print product, namely by using database administration software and a communication network for the automated selection and combination of information and advertisement units. The selected information and/or advertisement units are compiled by a computer based layout process to the final print product.

This selection and compilation of content as well as layout, which is executed via software, meets, by applying different algorithms and routines, the requirements of the customer individualized product irrespectively of the process of production.

Among those requirements are the following: the free purchase price decision of the customer, the taking into consideration of existing cost structures of the individual print product and the diversity of layouts of the available information and advertisement units. Moreover, according to the present invention, the system executes via a feedback mechanism and via a software based, customer specific content weighing process the customer individual compilation of a print product.

Comparably to the traditional mass produced print product, the mass produced customer individualized ("mass customized") print product is produced at the efficiency of mass production. Unlike the traditional product, is the mass customized print product is individualized and customer specific in a plurality of criteria, as among others content, quality, and price.

According to a preferred embodiment of the present invention, a computer-based system is used, which comprises at least one "server" or one "server engine" (SE). This SE provides at least two different kinds of databases and respectively serves for the establishing or maintenance of the access to these databases.

A first kind of database contains files providing the content of a print product and comprises text and picture documents, which are for example summaries, newspaper clippings, articles, and drawings. Copying such a file can result in expenses (e.g. payments to the author or the publisher of the document) or revenues (e.g. for advertisement). Preferably, the system comprises a database for the cost creating "information units" and a second for the revenue creating "advertisement units".

A second kind of database comprises information on the selection profile. This database comprises, according to the invention, typically historical information on customer orders (customer database), and/or information to new orders (e.g. subject categories and prices in an order database), and/or information on cost calculation (e.g. production costs, target gross margin).

Moreover, the system comprises a plurality of customers (e.g. readers) and suppliers (e.g. authors of articles, publisher, news agencies).

The suppliers can be linked with the SE via state-of-the-art electronic communication systems. They can interact and can exchange information with the SE. According to the present invention, the communication can comprise messages via the Internet or via LAN (Local Area Network) or WAN (Wide Area Network) or the transmission of e-mails. The used languages hereby can comprise HTML, XML, and any other applicable communication language and/or any other protocol.

Customers can interact with the SE of the system and convey orders/instructions by every form of the aforementioned electronic communication system or with the help of a state of the art telecommunication device (e.g. phone, fax, PDA, radio equipment). They can use state of the art ways of information transfer, as e.g. via voice, writing (sending faxes), acoustic tape signal, electronic tape signal, SMS, electronic, radiofrequency, infrared, or ultrasonic signals or every combination of these possibilities.

Either the publisher or the system generates for every "content file" via an encoding system that includes a unique and preferably permanent ID code, before the file is loaded in one of the aforementioned "content databases". Downloading the file from a source database executes a state-of-the-art keyword analysis that creates this ID code.

With the help of the ID-encoding system the SE can identify similarities of files within a database, as well as similarities of files being saved in different databases, and their belonging to one specific subject category. Moreover, the ID code comprises relevant cost calculation information (generated expenses and generated revenues when copying the file). Furthermore, it can comprise relevant information concerning the layout of the content (shape and size of the document layout), a unique identification marker, which allows identifying the single file and/or the source database and any other criterion, which can be of importance, to identify the single file and to adapt the selection process using further attributes.

In a preferred embodiment the files/documents saved in the content database have a standardized graphic layout format, in which e.g. articles and pictures have a finite number of given shapes and sizes. This can be achieved, when the author or primary publisher of the article writes the document in one of the preferred formats, or alternatively, when the SE copies the source document into a blank document and adapts it in a way, that the copy of the content takes place in a frame of the preferred size.

The invention can take into account short-term as well as long-term customer preferences. A sub-routine, which comprises an algorithm, generates via a weighing function of the categories a ranking of categories from long-term (historical data of the relevant customer) and short-term (order information) customer preferences.

This weighing function can be according to the present invention typically statically or preferably dynamically adapted to the preference change behavior of the customer. In a preferred embodiment, a correction factor is computed from the analysis of similarities between consecutive historical orders of the relevant customer.

By taking into account the historical data, customers can not only chose a completely new profile for a print product, but additionally modify an earlier selection, by choosing one subject, of which they want to receive more information. In this case, giving a higher weighing for the subject concerned changes the ranking compared to earlier ranking. It is evident, that the sending of an order with respect to the choice of a subject represents a feedback on one or several earlier individualized editions.

After that the sub-routine has generated a ranking, the SE reads the ID-code of the files and saves the number as well as the generated copy costs or generated revenues of all appearing new files, belonging to the chosen category. "New" in this context means, that the document files of the relevant customer have been neither copied nor send to him at an earlier point in time.

A second sub-routine, containing an algorithm, computes from the chosen price and the cost calculation data (production costs, target gross margin) a minimum ratio (revenues to expenditures), calculates the sum of all expenditures for the documents and determines a minimum value for revenues. An algorithm generates a sequence of ID codes of those files, which generate revenues, in a way, that the totality meets the requirement of this minimum value. As a result, a set of ID-codes for the expenditures and revenues creating files is generated in a way, that taking into account the cost calculation, the chosen price can be kept.

To compile the final document of the individualized print product, the SE reads the chosen files and copies with underlying combination rules, the content of the documents is kept in a collection of defined page layouts.

In a preferred embodiment, a finite number of defined page layouts, in which frames of pre-defined size and shape are combined, are saved in a layout database. These page layout documents carry an ID-code, allowing the SE to identify the combination of frame shape and size used in the page layout. The used page layout ID-code is a combination of layout code fragments or segments of the content files ID encoding.

In a preferred embodiment of the present invention, the content files, belonging to the same subject category are grouped at the same rubric (e.g. "economy", "soccer") in the final print product. A grouping routine uses the subject identification segment of the ID-code of the content files.

Hereafter, the SE selects for every sub-group (belonging to the same rubric) matching page layout documents, copies the documents in a database, in which the files of the final print product are saved. Then the SE reads the selected content files and copies their content in the defined and allocated frame in the page layout document.

It is evident, that combinations of content files can occur, in which pages cannot be completely filled and frames remain blank. The system identifies this deviation by the comparison of the number of ID-codes of the content files with all possible permutations of the ID codes of the page layouts. The SE copies the content of a file from a content database in the identified free space. These documents can be copied e.g. from a database with non-specific advertisement content (e.g. advertisement for the print product itself).

In a preferred embodiment, a barcode is generated from the ID-code of the document. The bar code can be printed directly under the article, at the end of the segment/rubric or at any other place of the print document.

These bar codes can comprise different selection levels, allowing the customer, to vary the information depth (e.g. information related to a single Article, to a subject or a rubric). Further choice options for article series (follow-ups) or alternative content can be offered.

The aforementioned feedback mechanism used by the customer, grants options for the ranking and evaluation of the chosen subjects according to the individual importance and perceived usefulness for the customer.

The invention comprises completely as well as partially customer-individualized products. Completely customer individualized products require from the customer knowledge of the available information and his personal benefit from information on the single subject category. Consequently, for a 100% customer-individualized product, the impulse of the customer to decide on a new subject must be created either by external information resources (e.g. other newspapers, radio, TV) or by the content of earlier articles. To stimulate variety, the print product can comprise in variable portions non-individually chosen content: e.g. randomly chosen information, headlines, frequently requested information, or best ranked articles or stories.

Furthermore, the invention comprises the possibility to contain for such a product information bearing reference to the whereabouts of the user (e.g. local news). In this case, state-of-the-art methods for the localization in communication networks are used.

Because the process between the selections of the subject by the customer until the final print of the individual print product is automated and works without the interference of third parties, the system executes a "customer individual automated compilation process".

Using state of the art software of statistical data analysis, the existing customer database with customer individual selection data allows identifying opportunities and trends in the development of customer preferences. Moreover, it signalizes to the publisher and the authors the demand for specific subjects.

According to a further preferred embodiment of the print product, a maximum page number of the individual print product is given. The maximum page number is chosen to minimize forwarding charges. Typically, forwarding charges depend on weight, which means that to every weight category a certain fixed forwarding charge is allocated. Because it is advantageous to send with a minimal forwarding charge a maximum volume of the print product, the weight should be at the higher end of the weight category for a forwarding charge.

In general, a print product according to the present invention will have a lower volume compared to a non-individualized print product. A daily newspaper produced according to the present invention comprises solely the relevant information for the reader, which allows the reduction of the volume compared to a traditional daily newspaper. Hereby we can expect, that the average reader of a newspaper reads in actuality only a minor part of the newspaper. Reasons are that major parts of a standard newspaper are not of interest to the reader, who has limited time for reading the newspaper and who has to make a choice of the articles that he perceives to be most relevant for him.

Taking into account that the average reader is only reading a minor part of the standard newspaper, the text content of the individualized newspaper according to the present invention can be limited e.g. to 20% of the standard volume. The remaining 80% of the volume is "information waste", which is not read by the reader because it is not matching his profile of interest and therefore needs not to be printed. This allows the above-mentioned optimization of the forwarding charges. Moreover, direct production costs, especially the material costs (paper, ink) can be reduced. A further and important advantage presents the preventive avoidance of waste, the reduction of waste paper, and the lasting protection of primary raw materials and energy.

According to a further preferred embodiment of the invention, the system is linked to a calculation system. Once an advertisement file is selected, it is registered by a database for the purpose of calculation. Different to the state of the art technology, it is possible to distribute an advertisement not to the totality of readers but to link the advertisement with an interest profile and provide therefore targeted advertisement. The costs of the advertisement will be calculated and invoiced automatically according to the number of customer individual print documents, for which the advertisement has been selected.

Overall, the present invention has the advantage, that it can rationalize the work of a publishing company. The complete selection process of content and advertisement as well as the layout are executed automatically and by taking into account technical and economical principles.

BRIEF DESCRIPTION OF THE DRAWINGS

In the following examples preferred embodiments of the invention are explained in greater detail by making reference to the drawings.

DETAILED DESCRIPTION OF PREFERRED EMBODIMENTS OF THE INVENTION

Figure 1:
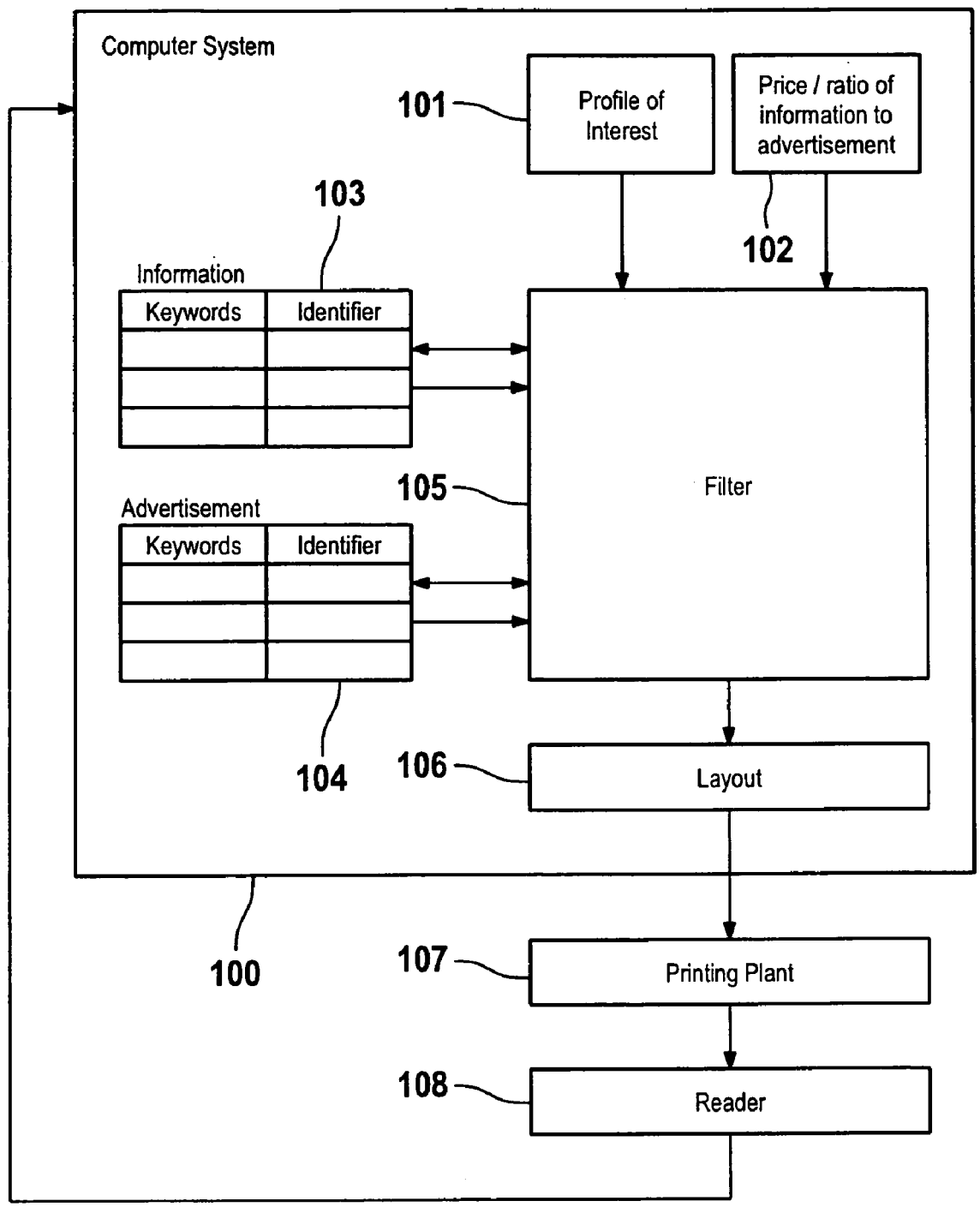
FIG. 1 a preferred embodiment of a system according to the present invention for the production of a customer individual print product.

FIG. 1 shows a block diagram of an embodiment of a system according to the present invention. This comprises a computer system 100 with a database 101 for saving the customer individual profiles of interest and a database 102 for saving customer individual selected prices respectively for saving customer individual ratios information to advertisement.

The computer system 100 comprises furthermore a database 103 for the access to information and a database 104 for the access to advertisement.

The database 103 comprises for every information file on which the system can have access via the database 103 one or several keywords. "Information" means here every information unit that is not an advertisement: e.g. articles, statements, and comments of all kind. This information is saved at the information file. To every information file, one or several keywords are allocated and saved in the database 103. Furthermore, to every single information in the database 103, an identifier is allocated. The identifier will be in the further context named an ID-code.

The computer system 100 comprises a database 104 for the access on advertisement, respectively advertisement containing advertisement files. To every single advertisement file one or several keywords are allocated. Furthermore, to every advertisement file, an identifier, meaning a so-called ID-code, is allocated.

The allocated identifier for every information file of a respective advertisement file comprises in an encoded form various information: e.g. the thematic allocation to a category, as "politics", "economy", "feature pages", "sports", "hobbies", "traveling" as well as corresponding sub-categories. Moreover, the identifier may comprise encoded information on the size and/or the format of the relevant file as well as on the costs respectively the revenues, the source and the creation date. Examples for embodiments for the identifier will be explained in more detail referring to the FIGS. 3A and 3B.

The computer system 100 comprises furthermore a filter 105. For the compilation of the print product for a specific customer the filter 105 takes access to the databases 101 and 102, to identify the interest profile of the relevant customer as well as the desired price respectively the customer-individually chosen ratio of information to advertisement. With the help of the profile of interest, read from database 101 a search of matching information-files is executed. Hereby a search in the keywords takes place.

In the case that the customer is willing to pay a significantly higher price for the print product, he may get an edition without any insertion of advertisement.

However, the customer also can opt for a lower price or for the free of charge delivery of the print product. According to the price level chosen by the customer, the ratio information to advertisement is determined. The advertisement is selected customer-individually from the database 104. Hereby, advertisement files with allocated keywords are identified, fitting to the best to the customer individual profile of interest.

The identified information files and advertisement files are transferred by the filter 105 to the layout module 106. Depending on the design of the layout module 106 it can be sufficient to transfer the corresponding format information from the identifiers in the layout module 106.

The layout module 106 selects a layout from a given set of layouts, allocating to every format field of the chosen layout as far as possible one information file or one advertisement file. After definition of the layout, the files are copied in to the format fields of the layout. Furthermore, a machine-readable identifier is generated for every information—and advertisement file, being allocated too to the format field.

After defining the layout on this way, the computer system 100 generates a print file, which is transferred to the printing plant 107. The printing plant 107 preferably uses a digital print system, which is 100 for the reception the print file linked online with the computer system.

In the printing plant 107, the customer individualized print product is produced. From there, the customer-individually produced print product can be distributed to the reader 108.

The reader 108 has the possibility of providing feedback to the computer system 100. For this feedback, several options exist:

The feedback takes place using a telecommunication device, as e.g. a phone. In this case, the identifiers of the print product consist of numerical and alphanumerical codes, which the user can type via the keyboard into the telecommunication device to transmit the code to the computer system 100. Hereby, the reader calls a service number for the manual entry of the codes. The codes can be too code-words, as e.g. "sports", "weather", . . . or such. In this case, the voice entry of the code-words by the reader is advantageous. The computer system 100 contains in this case a voice identification system, which recognizes the naturally spoken words and identifies code-words for the adaptation of the profile of interest.

The identifiers in the print product are different telephone numbers. To adapt his profile of interest, the reader 108 calls one or several of these phone numbers. Simultaneous to such a call, the phone number of the reader is transmitted—with the so-called Caller Line Identification (CLI) also known as "Caller ID". Such a call is registered by the computer system 100 and due to the calling number allocated to the reader 108. Depending on which number the customer called, the adaptation of the user's interest profile takes place in the computer system 100. It is advantageous, that a phone connection is not required, which is saving telephone charges. CLI can be used too for the manual or voice entry for the reader identification and the allocation of the entry to a profile of interest.

Furthermore, the reader 108 can operate a customer reading device, serving to read the machine-readable identifier. By selective reading of one or several machine-readable identifiers of the customer individual print product, the reader can announce, which of the information and of the advertisement is of higher and which is of lower interest. This information gathered by the customer reading device will be transferred in the form of a telecommunication message e.g. by a phone connection and entered into the computer system 100.

Due to this feedback the saved profile of interest in the database 101 will be adapted. A similar mechanism is possible too for the chosen price respectively the ratio information to advertisement. Hereby the customer has to engineer the corresponding machine-readable identifier with a customer reading device and to transfer this information as feedback to the computer system to adapt the price respectively the ratio of information to advertisement in the database 102.

The machine-readable identifier, which is allocated to every information and advertisement, can e.g. be generated based on the corresponding identifier in the database 103 and 104, by printing a corresponding barcode into the format field allocated to the information and advertisement.

The barcode reader can be connected e.g. to a mobile phone. The reader makes a phone connection with the computer system 100 by dialing a specific phone number. Simultaneously, the calling number of the reader's mobile phone is transmitted, allowing the computer system 100 to identify the reader. Hereafter the transfer of the reader selected identifier takes place. Alternatively, the identifiers themselves can identify the reader.

Together with the transfer of the identifiers information concerning the whereabouts of the readers can be transmitted. The current geographical position of the reader can be identified e.g. by a GPS-module (Global Positioning System) which can be integrated into a mobile phone. The current position of the reader is transferred to the computer system 100 and is taken into account in the selection of content and I or advertisement. The interest profile in the database 101 can e.g. comprise "local information"; the computer system 100 is then due to the transfer of the current whereabouts of the reader 108 in the position to select information which is fitting to the current whereabouts of the reader 108. Moreover, corresponding advertisement, as e.g. concert events or similar can be selected.

Therefore, the system in FIG. 1 is a learning system because it allows the reader 108 to give feedback, leading to a corresponding adaptation of the selection of information and advertisement. To receive an initial profile of interest from the reader, being the base for the further learning of the system, several options are possible.

The first option presents, that the reader names explicitly his profile of interest, e.g. by ticking of certain rubrics on an order from. Another possibility presents, that the reader is getting firstly a non-individualized print product. The reader is then choosing in this print product single information and/or advertisement by reading of the corresponding machine-readable identifiers.

This selection of readers is transferred to the computer system 100 and analyzed statistically. From the number of chosen information or advertisement from a certain rubric or to a specific subject result the interest focuses of the reader and by this his profile of interest, which is saved in the database 101. In a consecutive edition of the print product, this profile of interest is taken into account and the customer receives a correspondently individualized print product. This individualization is fine-tuned further by the possibility and means of feedback and adapted to the further development of reader interests.

Figure 2:
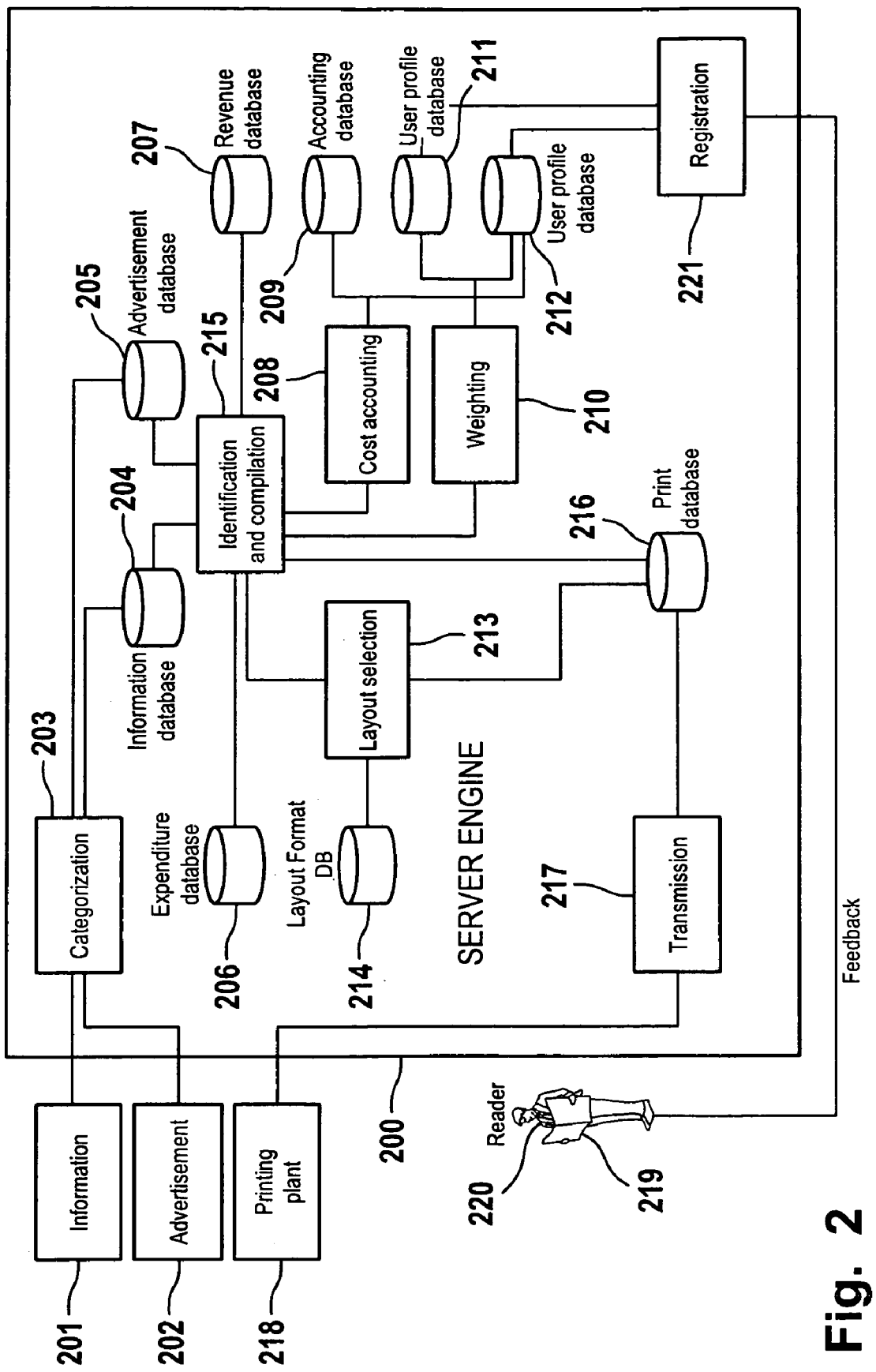
FIG. 2 a second embodiment of the system according to the current invention for the production of a customer individual print product.

The FIG. 2 illustrates a further preferred embodiment of the invention. The system comprises a server engine (SE) 200, which corresponds to the computer system 100 in FIG. 1. The server engine 200 is linked with the database 201, containing the information files.

Furthermore, the server engine 200 is connected with a database 202, containing advertisement files. Moreover, further databases 201 and 202 of different suppliers of information respectively advertisement clients are connected with the server engine 200 or can be contacted by the server engine 200.

The server engine comprises a program module 203 for the categorization of information files and advertisement files in the databases 201 respectively 202. The program module 203 serves to generate an information database 204, containing an entry for every information file, evaluated by the program module 203. This entry contains a field for the identification of the information file, an entry for the categories, a keyword for the description of the content and information on the format.

The program module 203 serves furthermore for the generation of an advertisement database 205, which in principal is similarly constructed as the information database 204, however contains advertisement files instead of information files, which have been evaluated by the program module 203. The information database 204 and the advertisement database 205 correspond in their basics to the databases 103 respectively 104 of the FIG. 1.

Furthermore, the server engine 200 comprises an access to an expenditure database 206 and a revenue database 207. The expenditure database 206 contains from every information file the costs related to the print of this information file, which means e.g. copyright royalties. The revenue database 207 contains for every advertisement file of the information database 204 an entry for the advertisement revenue for the print of the corresponding advertisement file in a customer individual print product.

The server engine 200 contains furthermore a program module 208 for the cost calculation. The program module 208 is linked to the accounting database 209, which contains the accounting parameters, as e.g. cost per print and the delivery of every single edition of the customer individual print product as well as the target gross margin per single edition.

Furthermore, the server engine 200 comprises a program module 210, which has access to the user profile databases 211 and 212. In the user profile database 210 the interest profile of the users are saved (compare database 101 of FIG. 1). This interest profile results from the observation of the reader behavior over time, meaning the historical customer selection of information and advertisement, which means that it relates to the long-term interest profile of the customer.

The user profile database 212 serves however for the registration of short-term and current interests of the reader. The reader has the possibility to announce for a specific subject his interest, which allows that this interest is especially taken into account in the selection of information. Furthermore, the currently accepted price is saved at the profile database 212.

The server engine 200 comprises furthermore the program module 213, which is linked with a layout format database 214. This layout database 214 serves the saving of a collection of layouts, based on different formats of a group of formats. The program module 213 can access these standardized layouts. The program module 213 chooses from the standardized layout one layout, which is fitting to the information files and advertisement files to print and in a way, that possibly all format fields in the chosen layout are filled with an information file or an advertisement file.

The information database 204, the advertisement database 205, the expenditure database 205, the revenue database 207, the program module 208, the program module 210 and the program module 213 are linked with the program module 215. The program module 215 receives from the program module 210 as receptive partner the weighted interest profile of the reader as well as the chosen price of the reader. The program module 215 identifies based on the profile of interest relevant information files in the information database 204 as well as relevant advertisement files for this profile of interest.

Thereafter, the program module 215 selects among the identified information files and possibly advertisement files a combination, allowing to realize the desired price of the customer. Hereby all expenditures and revenues of all relevant information files and advertisement files are gained from the databases 206 and 207. Furthermore, the target gross margin saved in the accounting database 209 and the print costs and further costs computed by the program module 208 are taken into account.

The information files and advertisement files are selected by the program module 215 in a way that the given price from the customer for the customer individual print product as well as the given target gross margin is achieved. This takes place based on the expenditures related to the print of the selected information files and on the revenues related to the advertisement files.

After the selection of information files and advertisement files for the customer individual print product, the program module 213 is started for the selection of the layout. The program module 213 searches a standardized layout within the layout format database 214, which is fitting well to the information files and advertisement files to be printed, in a way that as possible all format fields are coverable without blanks by information files and advertisement files.

After the layout selection in the program module 213, a print file is generated by the program module 215, which is saved in the print database 216. This print file is transmitted via interface 217 electronically to the printing plant 218 and will be preferably printed with a digital printing system. This digital printing system can be linked directly to the interface 217. From the printing plant, the delivery of the customer individualized print product (e.g. a newspaper 219) to the reader 220 can take place.

The reader 220 has the possibility to communicate with the program module 221 of the server engine 200. The program module 221 serves for the registration of the reader 220 and the entry of data in the user profile databases 211 and 212. Furthermore, the reader 220 has, via the program module 221, the possibility, to enter feedback in the server engine 200. Based on the entry of the reader 220, the data in the user databases 211 and 212 are adapted with the help of program module 221.

Figure 3A:
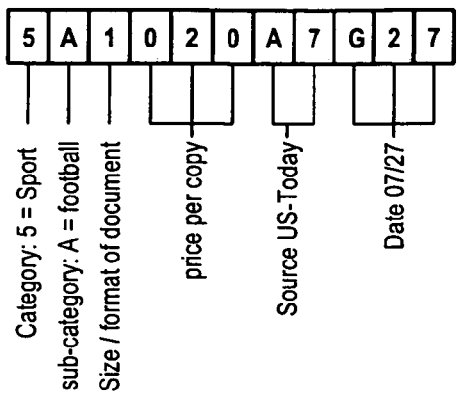
FIG. 3 two preferred formats for identifiers of information units.

FIG. 3A shows an example of an embodiment for the structure of an identifier of an information or an advertisement file (compare databases 103 and 104 of FIG. 1). The identifier in this case is an alphanumeric identifier with data fields for the categories, sub-categories, size and format of the document, price per copy of the source as well as creation date of the file.

In the case of FIG. 3A, it concerns an identifier of an information file of the category 5, meaning "sport" and the sub category A, meaning "soccer". The size and the format of the correspondent document is marked with the digit "1", which corresponds to a certain format of a given format set. Furthermore, the identifier comprises a designation for copyright royalties of 0.02 US-Dollar per copy as well as the newspaper "US-Today" as source and the $27^{th}$ of July as order date. The last mentioned information is encoded with "A7" respectively "G27".

Figure 3B:
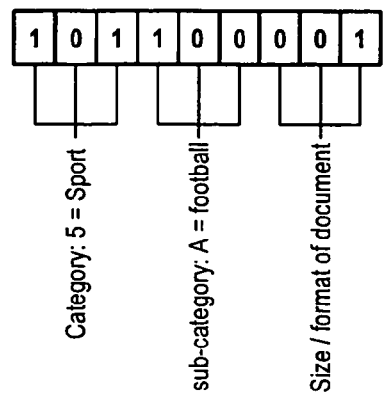

FIG. 3B shows an alternative format for such an identifier, having solely a numeric structure. The category 5, that means "sport", is coded as "101", the sub-category A, means "football" as "100" and the size and the format of the document as "001", etc.

Figure 4:
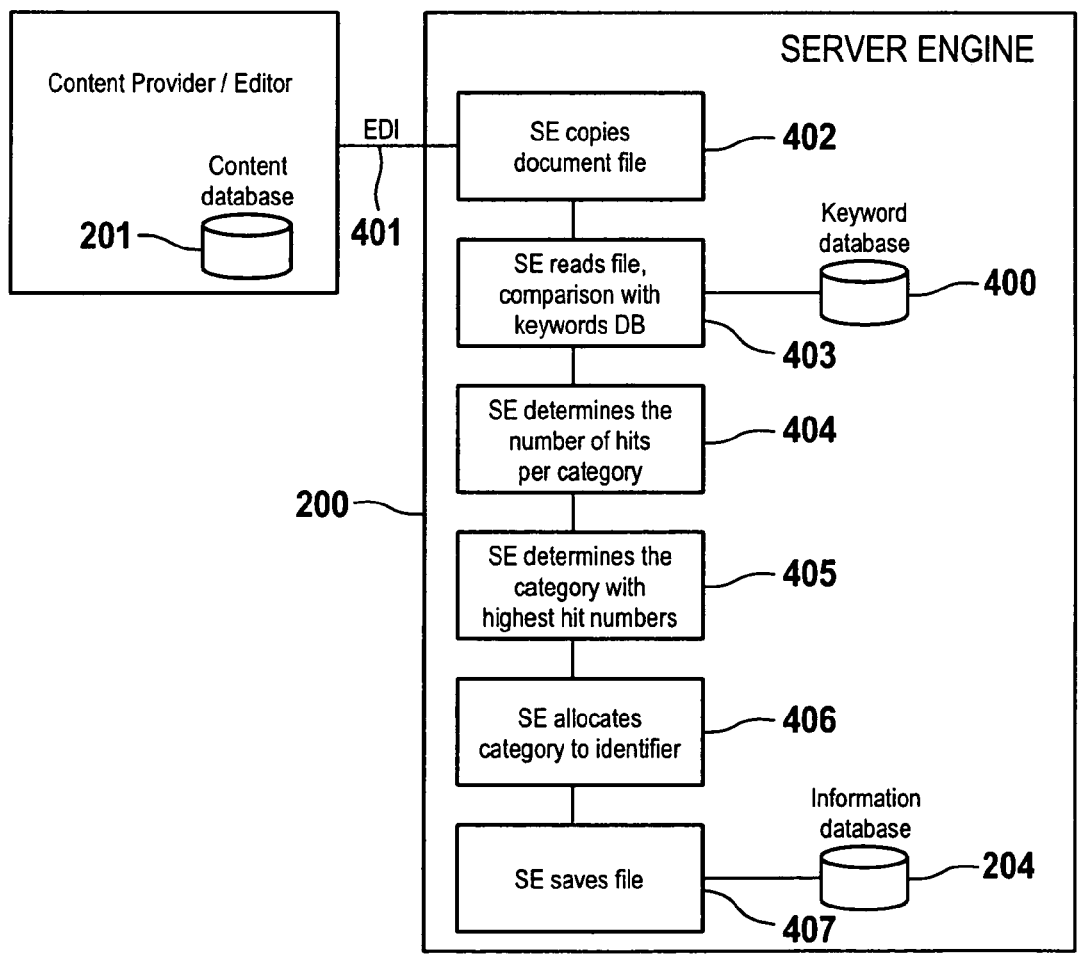
FIG. 4 a process for the generation of an information database.

FIG. 4 shows a process for the generation of a keyword database 400 for the information database 204 (compare FIG. 2). A so-called "content provider" or "editor" delivers information files from a database 201 to the server engine 200. This can take place e.g. by phone connection 401 via a standard EDI (Electronic Data Interface).

The server engine 200 generates, based on the data delivered from the database 201 in the step 402, a document file for every delivered information file. In the step 403, the Server Engine 200 reads such a document file and compares it with the keywords of the keyword database 400. In the step 404 the server engine counts the number of "hits" in the document file for the keywords of a certain category. From this information the server engine 200 determines in step 405 the category, of which the keywords show the highest number of hits within the document file.

The server engine 200 allocates in the step 406 a category identifier to the document file (compare category identifier "sports" in the identifiers of FIGS. 3A and 3B).

In the step 407, the server engine 200 saves the document file together with the identifier in the information database 204.

Figure 5:
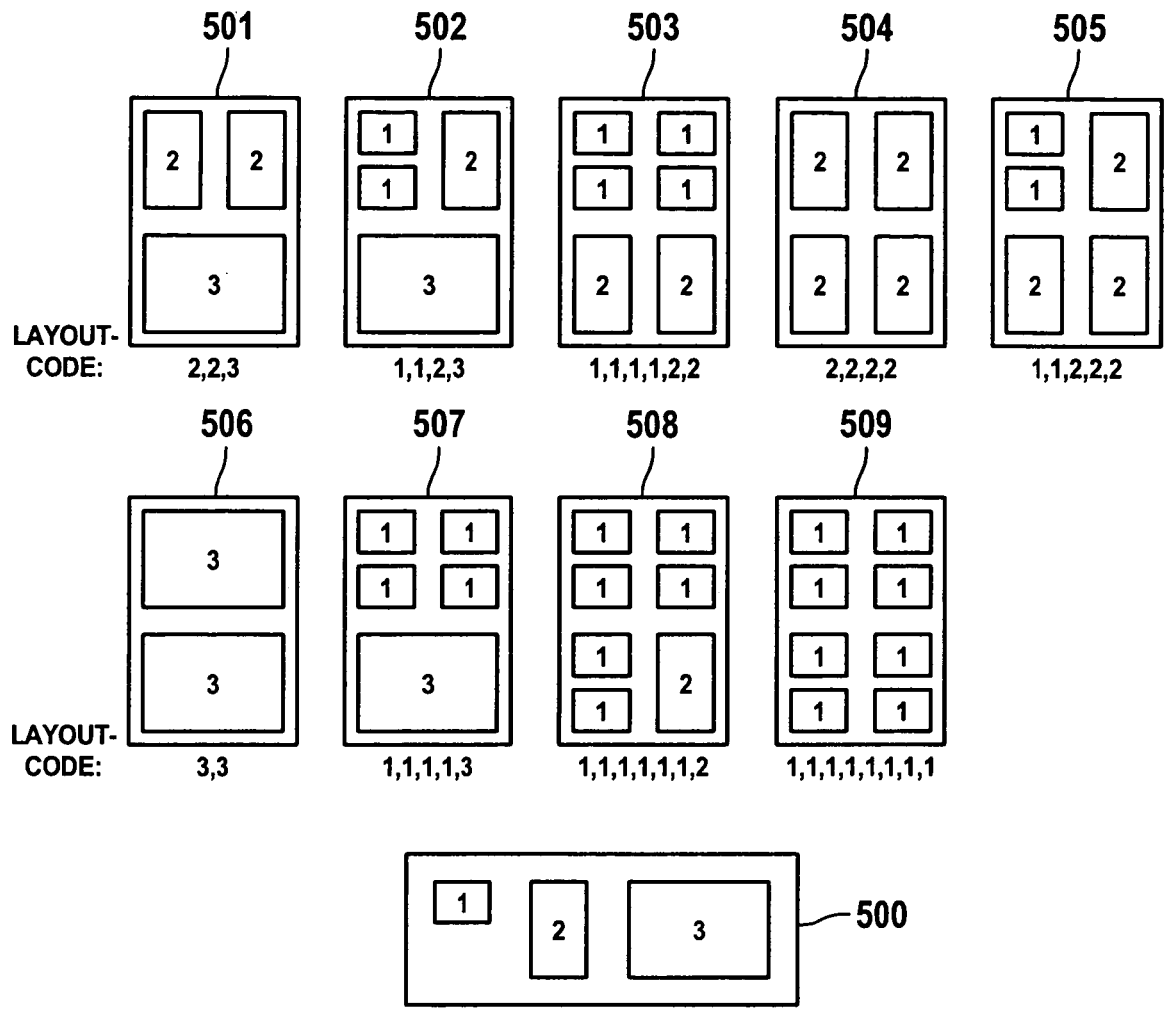
FIG. 5 a collection of layouts, based on different formats of a format group.

FIG. 5 shows a group of given layouts, which are saved in a layout format database 214. Every layout consists in the example of the format fields 1, 2 and/or 3 of the format set 500. The set consists of the given layouts 501-509.

Layout 501 for example consists of two format fields "2" and one format field "3". The layout 505 is allocated to the layout code "2,2,3". However, the layout 501 contains two format fields "1" and respectively one format field "2" and "3". This results in the layout code "1,1,2,3". Correspondently the layout codes can be explained for 503-509.

In the example of FIG. 3, every identifier of an information file or an advertisement file comprises a designation of the required format field for the print of the product, meaning here a format field 1, 2 or 3. For the layout selection (compare program module 213 of FIG. 2) for every page of the customer individual print product one of the standardize layout 501-509 is selected in a way that as possible a coverage of all format fields of the single pages by information files and advertisement files results.

Figure 6:
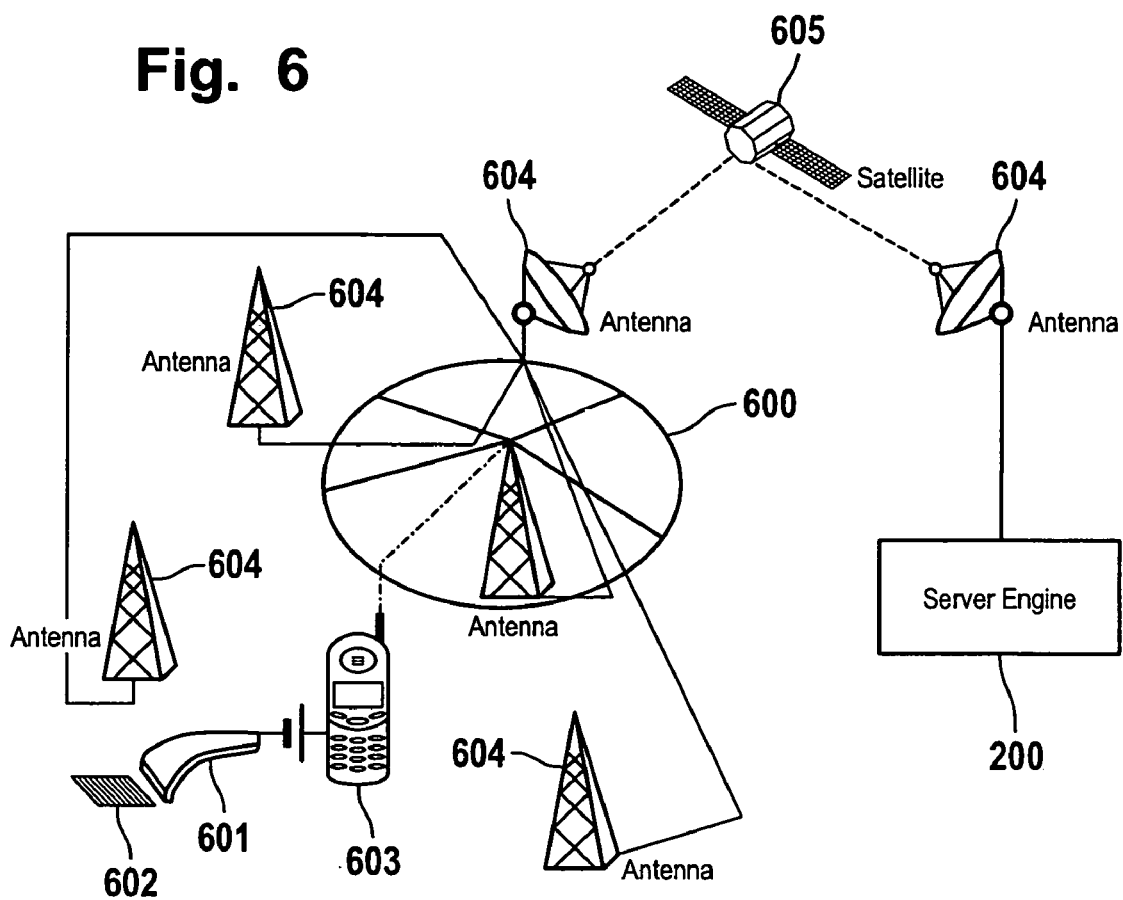
FIG. 6 a block diagram of a telecommunication system for the registration of a machine-readable identifier.

FIG. 6 shows a telecommunication system, which comprises a digital mobile phone web with mobile phone cells 600. The reader (compare reader 108 of FIG. 1 and reader 220 of FIG. 2) possesses a customer reader device, e.g. a barcode scanner 601. The barcode scanner 601 serves for reading of machine-readable identifiers 602, which are printed on the customer individual print product.

Hereby a machine-readable identifier 602 exists for every information and every advertisement, containing at least information of the relevant information or advertisement. Such a machine-readable identifier 206 can be printed in the same format field in which too the information or advertisement is printed or in a border area directly allocated to the format field.

It is possible that different machine-readable identifiers 602 are used in order to allow to the user a better specification that matches his desires. Further, it is possible that two machine-readable identifiers 602 are used, for example to announce, "this subject is of interest for me" or "this subject is of high interest for me". Furthermore, different machine-readable identifiers can express, that a certain category of events is currently of high interest or e.g. the customer wants to change the price.

For the adaptation of the profile of interest respectively for the change of the agreed price, the reader has to use the barcode scanner 601, in order to read the machine-readable identifier 602. The readers can e.g. read a machine-readable identifier 602 with the bar code scanner 691, to indicate, that he wants to pay in the future a different price. Reading the print product, the reader can scan the machine-readable identifier 602 of interesting respectively very interesting articles or too of advertisement.

The barcode scanner 601 is connectable with the mobile phone 603 or integrated in the same. Via the mobile phone 603, the reader transmits with the barcode scanner 691 the scanned machine-readable identifiers. This transmission takes place via the digital mobile phone network, via various antennas 604 and if required a satellite 605 and finally reaches the server engine 200 (compare FIG. 2). The server engine analyzes the transmitted data of the identifiers and adapts the profile of interest respectively the price (compare databases 101 and 102 of the FIG. 1 as well as user profile of the databases 211 and 212 of FIG. 2).

Furthermore, information concerning the mobile phone cell 600 of the mobile phone 603 can be transmitted. The device can be located by GPS, COO (Cell of Origin) or any other available positioning technology and the position can be identified. The transmitted information to the server engine 200 contains a position designation of the reader, which allows the current position of the reader to be included in the selection of information and advertisement. Information and advertisement (e.g. for local events), concerning only readers in a limited geographical distance, can be marked by the publisher or the advertisement client with a local code. Due to the transmission of the reader's position, the scanned information of the machine-readable ID-code is automatically accomplished by a further code, the local code. Hereby, an automated selection of specific, with other local codes linked information and advertisement units from the information database 204 or the advertisement databases 205 and 716 will be excluded.

FIG. 7 shows exemplary for a further preferred embodiment the steps from the primary registration of a new user until the final delivery of a customer individual individualized print product. In the step 700, the reader connects with the server engine, e.g. via a mobile phone and enters, in step 701, his name, address, and the date of the first delivery. Alternatively, the reader can fill in a format and to send it via e-mail, fax, or by mail to the operating company of the server engine. This data are saved in the user profile database 210 (compare FIG. 2). In step 702, a new file is defined for user database 212. This contains in the beginning just the price desired by the customer.

In step 703, the user executes an entry, e.g. after reception of a first non-individualized edition of the print product and after the selective reading (scanning) of different machine-readable identifiers (compare FIG. 6). The server engine 200 registers in step 704 this data entered from the reader and saves it in the user profile database 212 and/or the user profile database 210.

After step 704, the steps 705, 706, and 707 for the determination of a weighing function for the profiles of interest are executed.

In step 705, the SE accesses the user database 210. Based on the saved data in the user database 210, the PCI (Preference Change Index) is computed.

For n>0, the PCI results in $$PCI = c * \left(1 - \frac{\sum_{i=1}^{n} \frac{Ti}{Si}}{n}\right)$$

And for n=0, the PCI=1, with $T_i$: Number of similarities between categories of identifiers of every single pair of consecutive orders respectively deliveries of the print document.

$S_i$: Number of chosen categories of the earlier of both orders/deliveries n: total number of pairs of consecutive orders/deliveries of the print product c: correction factor The correction factor "c" can e.g. be described as a function of the total number of pairs:

$$(a) \text{ For } n > 0: \quad c = 1 - \frac{1}{n}$$

The PCI gives the average change between different orders and weighs these changes by the number of orders that the customer has placed in total.

A preferred embodiment, utilizes the weighing function and the PCI, and computes via an algorithm the weighing factor for the chosen category in a specific sequence, for example:

$$g(x) = \frac{e \, \exp(x * PCI)}{\sum_{x=1}^{z} e \, \exp(x * PCI)}$$

with g(x): Weighing factor for the chosen category of the delivery x z: order number of the last order E: Euler's index PCI: "Preference Change Index"

Accessing the user database 212, the calculation of this weighing function takes place in step 707.

For the formation of a ranking of interesting categories for a new edition X of the print product the following process is executed:

1. Firstly, the PCI index is computed based on the historical behavior of the customer. For every edition of the print product, the reader has the possibility to select one or more categories and to communicate to the system by means of a feedback, as mentioned above. The reader selects for the edition i of the print product a set $M_i$ of categories. The number $T_i$ is determined by comparison of the sets $M_{i-1}$ and $M_i$. From the number of similar elements Mi and $M_{i-1}$ results the number Ti. The number $S_i$ is equal to the number of elements of the set $M_{i-1}$.

2. Then for all earlier editions of the print product the weighing factors g(1), g(2) are calculated according to the aforementioned formula.

3. For every category a weighing factor $G_{category}$ is computed, which results of the following formula:

$$G_{category} = \sum_{x01}^{z} g(x) * (\text{number-of-elements-category-edition-}x)$$

4. With "number-of-elements-category-edition-x" being the number of selections of the relevant category for a specific edition x of the print product. Then the information (and advertisement) are selected automatically by the system in proportion to the weighing G of the single interest categories Long-term as well as short-term reading behavior is included by the weighing function, whereas the weighing between long-term and short-term reading behavior is taking into account the specific type of customer, means if the customer in historical view has changed his interests more or less frequently.

A relatively high weighing of relevant category or sub-category remains when a reader e.g. in the historical perspective has been constantly interested in a specific category, as e.g. "sports" or "soccer", even when he is currently ordering the information to a different category, as e.g. federal elections or similar.

Based on the generated weighing functions the system executes now in step 708 a sorting of relevant information files of the information database 204 as well as in step 709 a sorting of the relevant advertisement files from the advertisement database 205. The server engine selects from the according to the weighing function sorted listings files. The selection of information files takes place until the maximum volume is achieved.

Figure 7A:
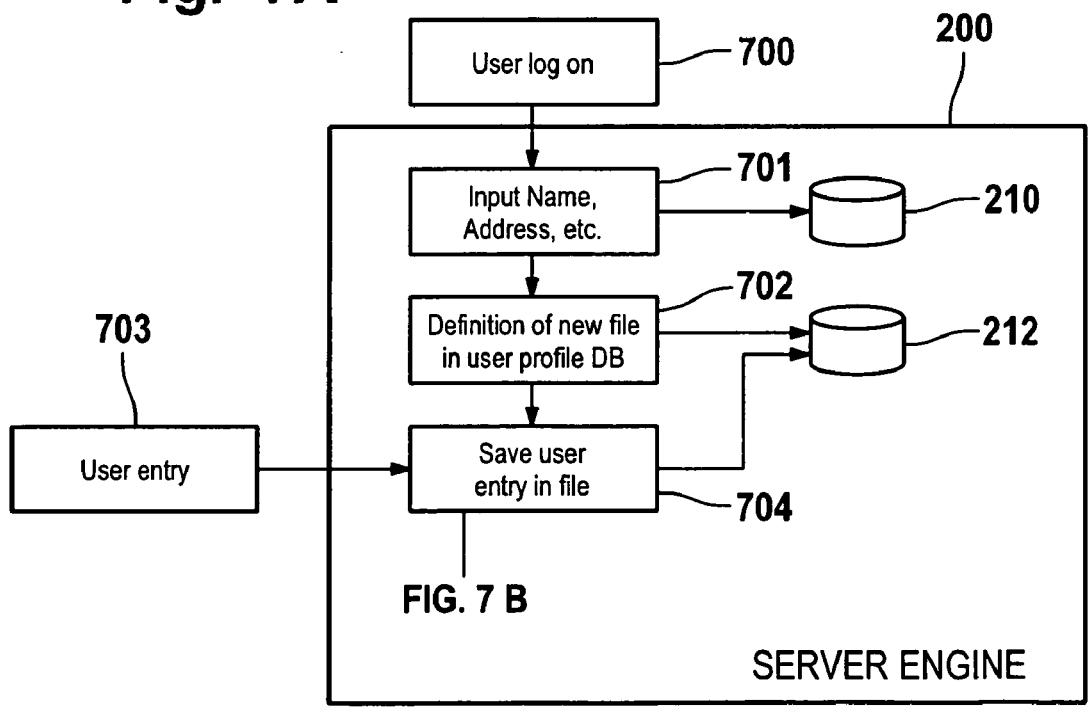
FIG. 7 A-F an illustration of the preferred embodiment of a process according to the present invention for the production of a customer individual print product.
Figure 7B:
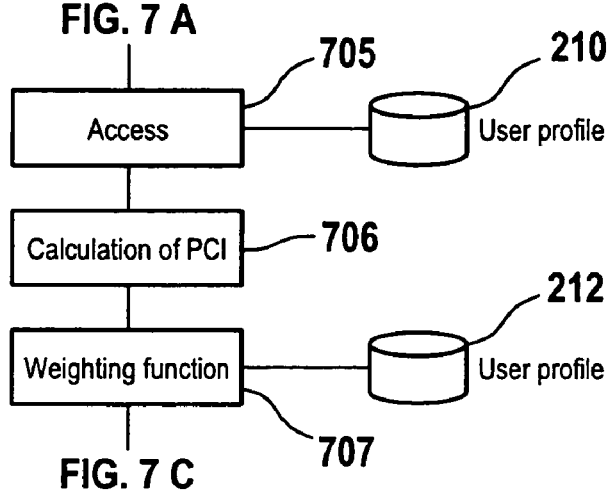
Figure 7C:
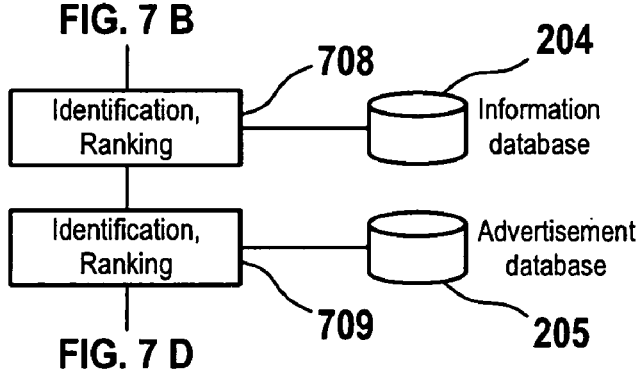
Figure 7D:
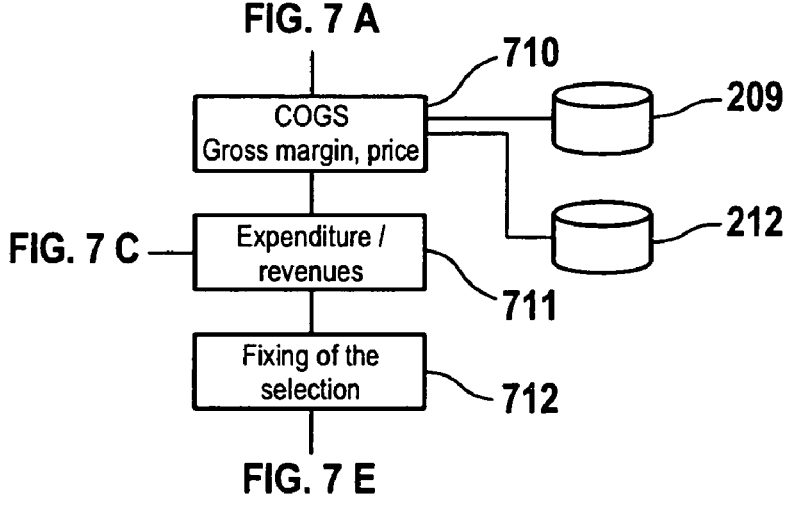
Figure 7E:
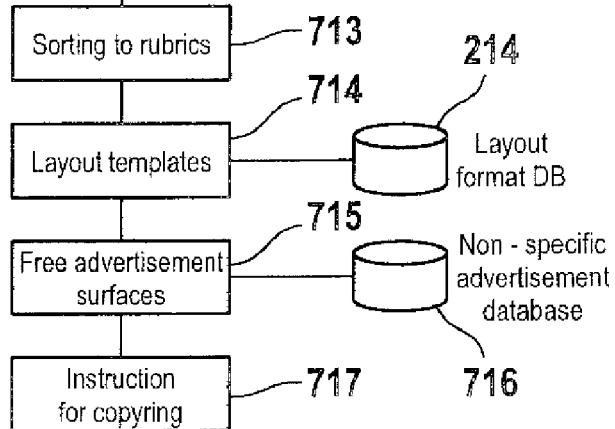
Figure 7F:
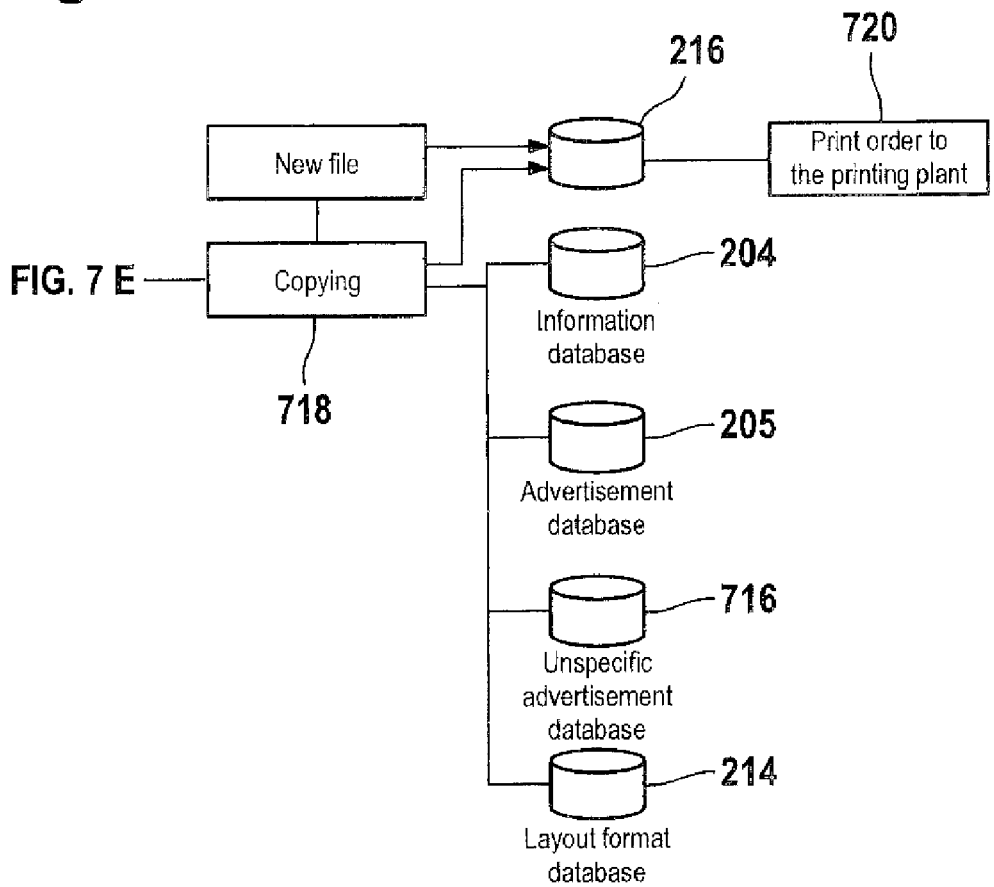

FIG. 7D shows the steps 710, 711, and 712 for the final fixing of the selection of information files and advertisement files. In step 710, the system accesses the accounting database 209 and the user profile database 212 (compare FIG. 2). From the accounting database 209, the economic parameters "cost of goods sold" and the target gross margin (CM) as well as the chosen price are read.

Based on the results of the steps in FIG. 7C, meaning the sorted information file listings and advertisement file listing, in step 710, an analysis of expenditures and revenues is executed. Hereafter the final confirmation of the selection of information and advertisement databases takes place in step 712.

In step 713, the selected information files are sorted to rubrics, that means, e.g. "politics", "international news", "weather"; "features" or "sports". For the in rubrics sorted information files, the system selects in step 714 accessing the layout format database 214 standardized layouts and allocates the information files as well as the advertisement files to the format field in the chosen layout.

In the case that blank format fields remain, they will be filled in step 715 with general (non specific) advertisement from a general advertisement database 716. In the step 717, a copy instruction is generated, specifying the information files and advertisement files to copy.

The copying of the files in the step 718 takes place by access to the relevant files in the information database 204, the advertisement database 205, the general advertisement database 716, as well as the layout format database 214.

Preferably, the print orders are collected in the print database 216 for a defined period of time, before transferring them to the printing plant. Orders can be collected e.g. during a day and transferred at 24H00 to the printing plant, so that there remains sufficient time to execute the printing orders and to deliver the newspaper in time to the customers.

In the following, FIG. 8 will be explained referring to a further embodiment of the automated layout process according to the present invention. In step 800, the selection of information and advertisement takes place for the edition of print product. As mentioned before, the selection is customer individual. Every chosen information and advertisement has a certain format being encoded in the identifier allocated to the corresponding file.

In step 801, the format codes of the chosen information and advertisement files are gathered to a format chain. In step 802, the index i is set to 1.

In step 803, a sub-format chain $U_i$ is formed. For this sub-format chain $U_i$ the set LE of layouts is determined in step 804, which have a layout code, being a permutation of the format sub-chain $U_i$.

In step 804, the system checks, if the set Li is empty. If this is not the case, the index is increased incrementally in step 806 and the sub-format chain $U_i$ is extended by one next element of the chain K. Hereafter, the set $L_i$ for the extended chain is determined again in step 804.

If the analysis in step 805 shows, that the set $L_i$ is empty, the step 807 is executed. In the step 807, the layout is selected from a set $L_{i-1}$. If the set $L_{i-1}$ contains more than one format, a random element of the set $L_{i-1}$ can be selected. The information and the advertisement, corresponding to the chain $U_{i-1}$, are allocated to the layout and the format fields of the chosen layout are covered correspondently by this information and advertisement.

In step 808, the difference set betweens the format chain K and the chain $U_{i-1}$ is formed. This difference set is defined as new format chain K. Furthermore the index is set back from i to i−1. Hereafter the flow control goes back to the step 803, to select the layout for the next page of the print product and to allocate information and where appropriate the advertisement to the remaining format chain K. This flow is executed until the new format chain is an empty set.

Alternatively, the flow is abandoned, after a given number of pages of the print document is generated in the described way. The specification of a maximum page number can be advantageous concerning the minimization of freight charges and the reduction of the waste paper volumes.

Figure 8:
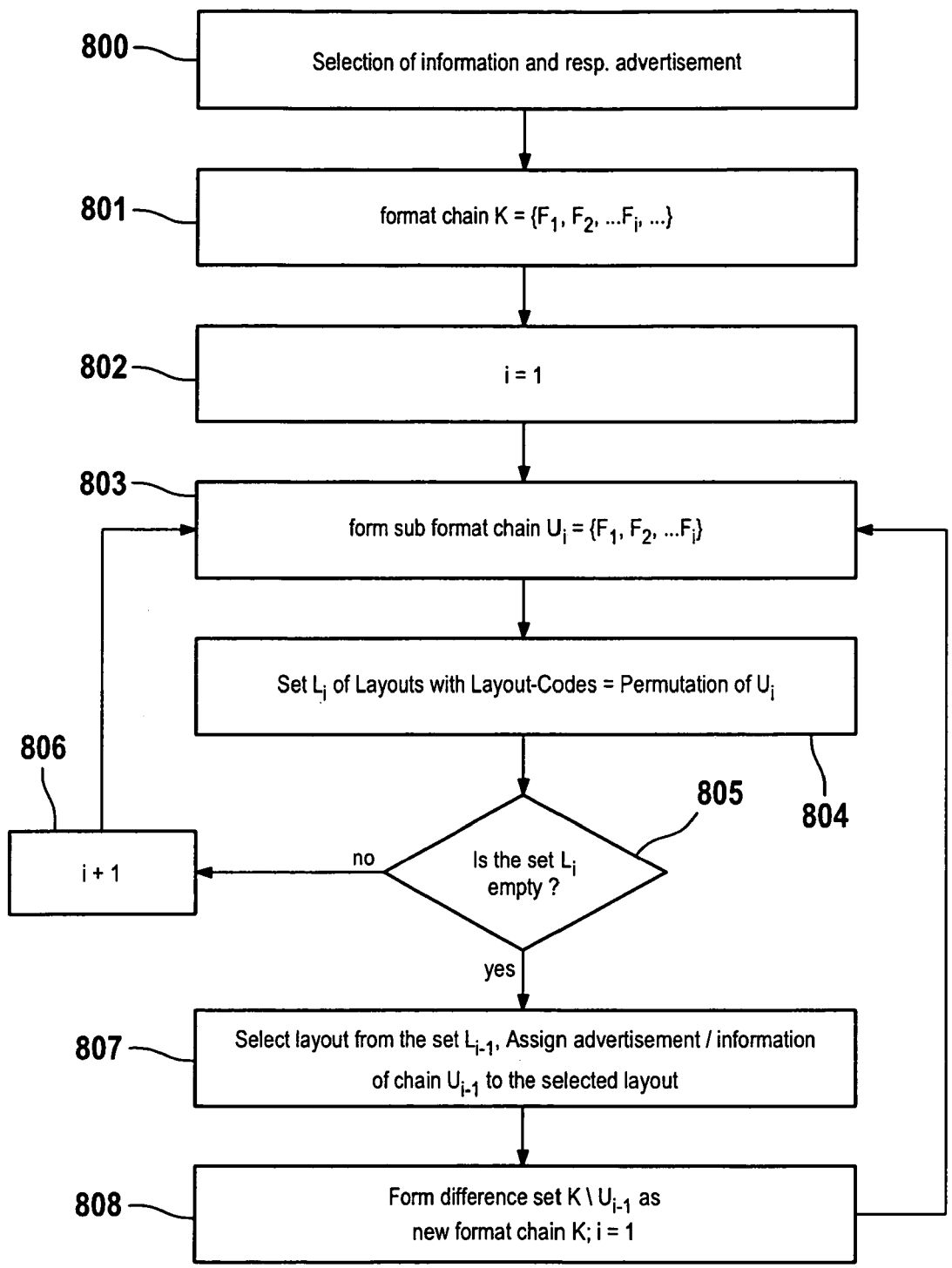
FIG. 8 an illustration of the flow chart for the automated layout.

The automated layout according to FIG. 8 can have as a consequence, that the single format fields remain blank. In this case, these format fields are filled with non-customer-specific, general advertisements. Compare the advertisement database 716 of the FIG. 7E.

To limit the number of blank format fields, it is advantageous, to check after step 807, if for the chosen layout, blank format fields exist. If this is the case, elements of the difference set $K/U_{i-1}$ can be checked, if format codes F are existing, fitting to the blank format fields of the chosen layout. If this is the case, the format field can be filled and the difference set will be reduced by that element, which can be allocated in the aforementioned way.

What is claimed is:

1. A customer individual automated compilation method of mass producing printing products containing articles correlated with a set of categories periodically distributed to a plurality of customers as editions comprising the steps of:
   a. inputting by each customer to a customer profile database identification information including geographical position, when delivery of an edition of a print product is to commence, a chosen price to pay, and a selection of single interest categories selected from a listing of categories, and following delivery of an edition inputting feedback by a customer for any updating of the chosen price to pay for the next edition, current geographical position or selection of a set of single interest categories;
   b. establishing an information database containing information files correlated with the listing of categories;
   c. establishing an advertisement database containing advertisement files correlated in part with the listing of categories;
   d. establishing an expenditure database containing cost related to printing each information file;
   e. establishing a revenue database containing revenue for printing an advertising file in a customer individual print product;
   f. establishing a layout database containing a collection of layouts based on different formats including fields of a group of formats;
   g. establishing an accounting database containing accounting parameters related to cost per print and delivery to a customer an edition of the individual print product and gross margin per single edition;
   h. categorizing by a first program information files and advertisement files obtained from supply sources and storing the files in the information database and advertisement database identified according to the listing of categories;
   i. executing a second program to determine and output from said information and advertisement databases a group of files correlated with a customer profile database to print for a given edition of the print product for that customer;
   j. executing a third program for the determined group of files from the second program to determine a weighing factor for each of the selected set of single interest categories contained in that customer profile database, sorting from the group of files a selection of relevant files automatically in proportion to the weighting factors of the selected set of single interest categories until a maximum volume is achieved;
   k. executing a fourth program with respect to the sorted selection of relevant files to conduct an analysis of expenditures and revenues compared to that customer's chosen price in correlation with the expenditure database, revenue database and accounting database, and on the basis thereof, finally selecting a portion of the relevant information and advertisement files in a proportion as determined by the aforesaid analysis;
   l. executing a fifth program to sort the selected portion of relevant files according to categories and based thereon selecting a layout from the layout format database that will accommodate in its format fields all the finally selected relevant files to obtain an output for a printed product for that customer;
   m. producing in response to the output of the fifth program a printed product containing machine readable formatted encoded identifiers associated at least with each printed file whereby that customer using a compatible machine reader is enabled to provide feedback input effectively according to step a; and
   n. delivering the produced printed product to that customer at his/her/its current geographical position.

2. A method according to claim 1 wherein step j. with respect to the weighing factor includes executing a subroutine of determining a preference change index (PCI) by calculating, for n>0, $$PCI = c * \left(1 - \frac{\sum_{i=1}^{n} \frac{Ti}{Si}}{n}\right)$$

And for n=0, PCI=1, where
$T_i$ is number of similarities between categories of identifiers of every single pair of consecutive orders respectively deliveries of the print document;
$S_i$ is number of selected categories of the earlier of both orders/deliveries;
N is total number of pairs of consecutive orders/deliveries of the print product; and
C is correction factor; a function of the total number of pairs, for n>0

$$c = 1 - \frac{1}{n}.$$

3. The method of claim 2 wherein step j. with respect to the weighing factor further includes executing a subroutine for computing via an algorithm the weighing factor for the chosen category in a specific sequence, $$g(x) = \frac{e\exp(x * PCI)}{\sum_{x=1}^{z} e\exp(x * PCI)}$$

where
g(x) is weighing factor for selected category of the delivery x;
z is order number of the last order;
E is Euler's index; and
PCI is Preference Change Index.

4. The method of claim 3 wherein step j. includes determining a weighing factor for each category by executing a subroutine according to the following $$G_{category} = \sum_{x01}^{z} g(x) * (number-of-elements-category-edition-x)$$

with "number-of-elements-category-edition-x" being the number of selections of the relevant category for a specific edition x of the print product.

5. A method according to claim 1 including the further step of imprinting the machine readable formatted encoded identifiers on the printed product in the form of bar codes.

6. Apparatus for customer individual automated compilation of mass producing printing products containing articles correlated with a set of categories periodically distributed to a plurality of customers as editions comprising:
   a. means for inputting by each customer to a customer profile database identification information including geographical position, when delivery of an edition of a print product is to commence, a chosen price to pay, and a selection of single interest categories selected from a listing of categories, and following delivery of an edition inputting feedback by a customer for any updating of the chosen price to pay for the next edition, current geographical position or selection of a set of single interest categories;
   b. means for establishing an information database for containing information files correlated with the listing of categories;
   c. means for establishing an advertisement database for containing advertisement files correlated in part with the listing of categories;
   d. means for establishing an expenditure database for containing cost related to printing each information file;
   e. means for establishing a revenue database for containing revenue for printing an advertising file in a customer individual print product;
   f. means for establishing a layout database for containing a collection of layouts based on different formats including fields of a group of formats;
   g. means for establishing an accounting database for containing accounting parameters related to cost per print and delivery to a customer an edition of the individual print product and gross margin per single edition;
   h. means for categorizing by a first program information files and advertisement files obtained from supply sources and for storing the files in the information database and advertisement database identified according to the listing of categories;
   i. means for executing a second program to determine and output from said information and advertisement databases a group of files correlated with a customer profile database to print for a given edition of the print product for that customer;
   j. means for executing a third program for the determined group of files output from the second program to determine a weighing factor for each of the selected set of single interest categories contained in that customer profile database, sorting from the group of files a selection of relevant files automatically in proportion to the weighting factors of the selected set of single interest categories until a maximum volume is achieved;
   k. means for executing a fourth program with respect to the sorted selection of relevant files to conduct an analysis of expenditures and revenues compared to that customer's chosen price in correlation with the expenditure database, revenue database and accounting database, and on the basis thereof, finally selecting a portion of the relevant information and advertisement files in a proportion as determined by the aforesaid analysis;
   l. means for executing a fifth program to sort the selected portion of relevant files according to categories and based thereon selecting a layout from the layout format database that will accommodate in its format fields all the finally selected relevant files to obtain an output for a printed product for that customer;
   m. means for producing in response to the output of the fifth program a printed product containing machine readable formatted encoded identifiers associated at least with each printed file whereby that customer using a compatible machine reader is enabled to provide feedback input effectively; and
   n. means for delivering the produced printed product to that customer at his/her/its current geographical position.

7. Apparatus according to claim 6 with respect to the weighing factor further including means for executing a subroutine for determining a preference change index (PCI) by calculating, for n>0, $$PCI = c * \left(1 - \frac{\sum_{i=1}^{n} \frac{Ti}{Si}}{n}\right)$$

And for n=0, PCI=1, where
$T_i$ is number of similarities between categories of identifiers of every single pair of consecutive orders respectively deliveries of the print document;
$S_i$ is number of selected categories of the earlier of both orders/deliveries;
N is total number of pairs of consecutive orders/deliveries of the print product; and
C is correction factor; a function of the total number of pairs, for n>0

$$c = 1 - \frac{1}{n}.$$

8. Apparatus according to claim 7 wherein further including means for executing a subroutine for computing via an algorithm the weighing factor for the chosen category in a specific sequence, $$g(x) = \frac{e\exp(x*PCI)}{\sum_{x=1}^{z} e\exp(x*PCI)}$$

where
g(x) is weighing factor for selected category of the delivery x;
z is order number of the last order;
E is Euler's index; and
PCI is Preference Change Index.

9. Apparatus according to claim 8 further including means for determining a weighing factor for each category by executing a subroutine according to the following $$G_{category} = \sum_{x01}^{z} g(x)*(\text{number}-\text{of}-\text{elements}-\text{category}-\text{edition}-x)$$

with "number-of-elements-category-edition-x" being the number of selections of the relevant category for a specific edition x of the print product.

10. Apparatus according to claim 6 including means for imprinting the machine readable formatted encoded identifiers on the printed product in the form of bar codes.

11. Computer-readable medium containing program instructions for a customer individual automated compilation of mass producing printing products containing articles correlated with a set of categories periodically distributed to a plurality of customers as editions comprising program instructions for:

a. inputting by each customer to a customer profile database identification information including geographical position, when delivery of an edition of a print product is to commence, a chosen price to pay, and a selection of single interest categories selected from a listing of categories, and following delivery of an edition inputting feedback by a customer for any updating of the chosen price to pay for the next edition, current geographical position or selection of a set of single interest categories;

b. establishing an information database containing information files correlated with the listing of categories;

c. establishing an advertisement database containing advertisement files correlated in part with the listing of categories;

d. establishing an expenditure database containing cost related to printing each information file;

e. establishing a revenue database containing revenue for printing an advertising file in a customer individual print product;

f. establishing a layout database containing a collection of layouts based on different formats including fields of a group of formats;

g. establishing an accounting database containing accounting parameters related to cost per print and delivery to a customer an edition of the individual print product and gross margin per single edition;

h. categorizing by a first program information files and advertisement files obtained from supply sources and storing the files in the information database and advertisement database identified according to the listing of categories;

i. executing a second program to determine and output from said information and advertisement databases a group of files correlated with a customer profile database to print for a given edition of the print product for that customer;

j. executing a third program for the determined group of files output from the second program to determine a weighing factor for each of the selected set of single interest categories contained in that customer profile database, sorting from the group of files a selection of relevant files automatically in proportion to the weighting factors of the selected set of single interest categories until a maximum volume is achieved;

k. executing a fourth program with respect to the sorted selection of relevant files to conduct an analysis of expenditures and revenues compared to that customer's chosen price in correlation with the expenditure database, revenue database and accounting database, and on the basis thereof finally selecting a portion of the relevant information and advertisement files in a proportion as determined by the aforesaid analysis;

l. executing a fifth program to sort the selected portion of relevant files according to categories and based thereon selecting a layout from the layout format database that will accommodate in its format fields all the finally selected relevant files to obtain an output for a printed product for that customer;

m. producing in response to the output of the fifth program a printed product containing machine readable formatted encoded identifiers associated at least with each printed file whereby that customer using a compatible machine reader is enabled to provide feedback input effectively according to step a; and n. delivering the produced printed product to that customer at his/her/its current geographical position.

12. Computer-readable medium containing program instructions according to claim 11 further including program instructions with respect to the weighing factor for executing a subroutine of determining a preference change index (PCI) by calculating, for n>0, $$PCI = c*\left(1 - \frac{\sum_{i=1}^{n} \frac{Ti}{Si}}{n}\right)$$

And for n=0, PCI=1, where
$T_i$ is number of similarities between categories of identifiers of every single pair of consecutive orders respectively deliveries of the print document;
$S_i$ is number of selected categories of the earlier of both orders/deliveries;
N is total number of pairs of consecutive orders/deliveries of the print product; and
C is correction factor; a function of the total number of pairs, for n>0

$$c = 1 - \frac{1}{n}.$$

13. Computer-readable medium containing program instructions according to claim 12 further containing program instructions with respect to the weighing factor for executing a subroutine for computing via an algorithm the weighing factor for the chosen category in a specific sequence, $$g(x) = \frac{e\exp(x*PCI)}{\sum_{x=1}^{z} e\exp(x*PCI)}$$

where g(x) is weighing factor for selected category of the delivery x;

z is order number of the last order;

E is Euler's index; and

PCI is Preference Change Index.

14. Computer-readable medium containing program instructions according to claim 13 further containing program instructions for determining a weighing factor for each category by executing a subroutine according to the following $$G_{category} = \sum_{x01}^{z} g(x) * (\text{number} - \text{of} - \text{elements} - \text{category} - \text{edition} - x)$$

with "number-of-elements-category-edition-x" being the number of selections of the relevant category for a specific edition x of the print product.

15. Computer-readable medium containing program instructions according to claim 11 further containing program instructions for imprinting the machine readable formatted encoded identifiers on the printed product in the form of bar codes.

* * * * *